April 23, 1963     A. E. WETTER     3,086,752
BOAT TRAILER JACK
Filed July 5, 1960
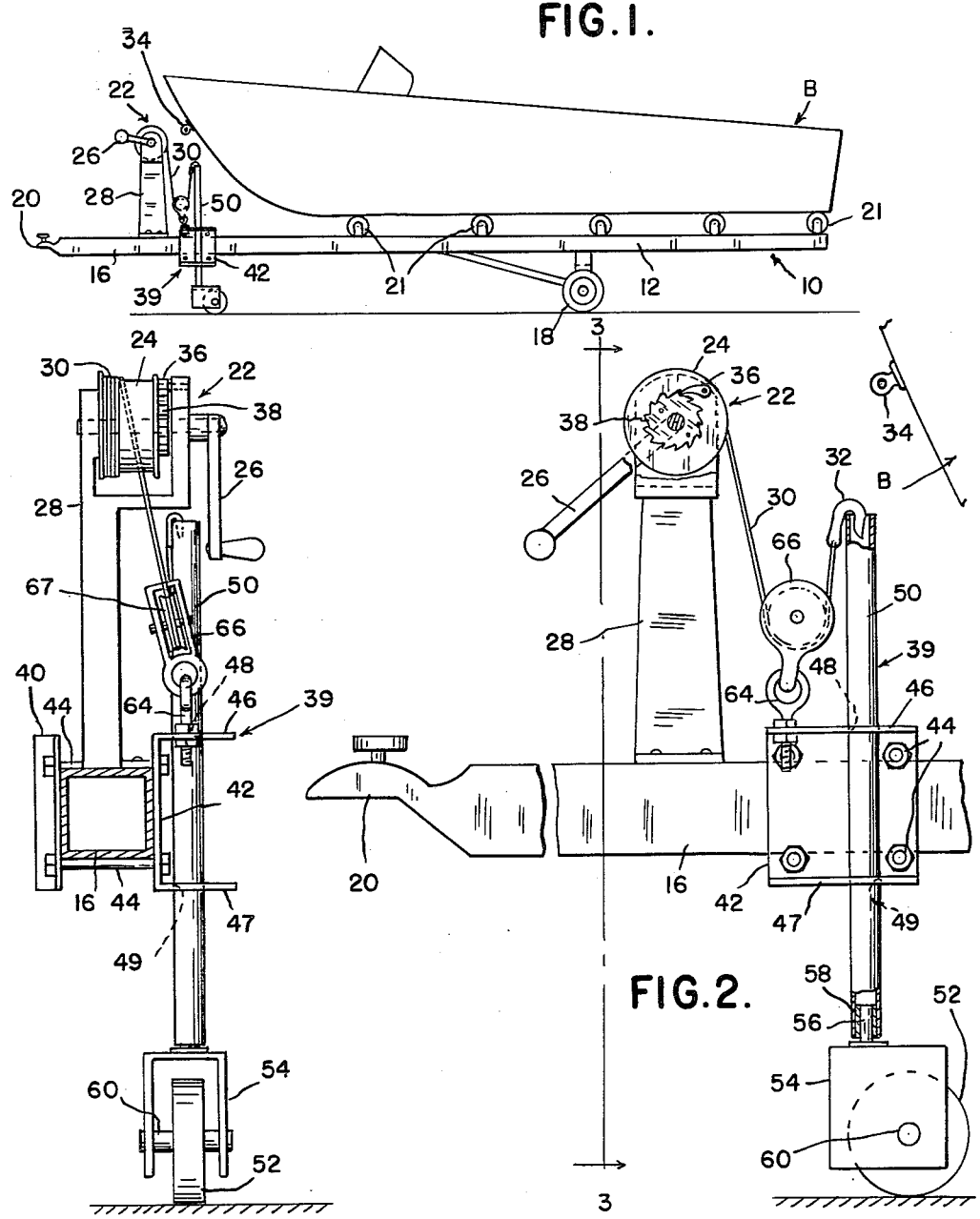
FIG. 1.
FIG. 2.
FIG. 3.
INVENTOR.
ALLAN E. WETTER
BY 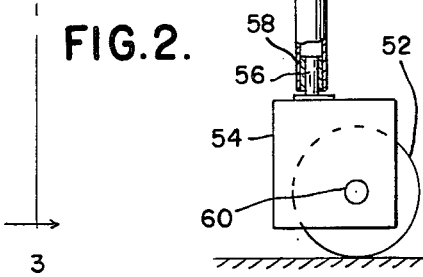
ATTORNEYS

United States Patent Office 3,086,752
Patented Apr. 23, 1963

3,086,752
BOAT TRAILER JACK
Allan E. Wetter, 1447 Washington Blvd.,
Birmingham, Mich.
Filed July 5, 1960, Ser. No. 40,817
6 Claims. (Cl. 254—86)

This invention relates generally to jacks and refers more particularly to boat trailer jacks.

One object of the invention is to provide an improved trailer jack, particularly for boat trailers, which is capable of supporting the trailer tongue in an elevated condition. In a broader sense, the jack may be employed to support the trailer at any point spaced longitudinally from the ground-engaging wheels.

Another object of the invention is to provide a boat trailer jack which enables an unhitched trailer to be moved from place to place with ease.

Another object of the invention is to provide a boat trailer jack which is particularly designed to facilitate hitching and unhitching of the trailer.

Another object of the invention is to provide a boat trailer jack as above described which may be operated by the usual boat winch and cable provided as standard equipment on most boat trailers.

Another object of the invention is to provide a jack for a boat trailer of the type having a wheeled boat support, a tongue projecting forwardly from the boat support for hitching to a towing vehicle and a boat winch for loading and unloading a boat, the jack comprising a vertically movable rod carried by the tongue, and means including the boat winch and cable for forcing the rod downwardly into engagement with the ground under a pressure sufficient to elevate the tongue. Preferably a roller or caster is swiveled on the lower end of the rod to permit movement of the trailer along the ground when not hitched to a towing vehicle.

Other objects and advantages of the invention will become apparent as the following description proceeds, especially when considered with the accompanying drawing, wherein:

FIG. 1 is a side elevational view of a boat trailer having a jack embodying my invention.

FIG. 2 is an enlargement of portions of FIG. 1.

FIG. 3 is a view taken on the line 3—3 of FIG. 2.

Referring now more particularly to the drawing, the boat trailer is generally indicated at 10 and comprises a frame or boat support 12 and a tongue 16 projecting forwardly therefrom. Ground-engaging wheels 18 are provided for the trailer, as illustrated. At the front end of the tongue, a conventional hitch 20 is provided for attachment to a towing vehicle. The hitch may be of any conventional form and therefore is not illustrated in detail.

The supporting frame 12 may be of any suitable construction and is shown as having transverse rollers 21 for supporting the boat B thereon.

Mounted on the trailer, preferably on the tongue 16, is a standard winch and cable for loading or unloading a boat. The winch is generally designated 22 and comprises a drum 24 having a crank handle 26 projecting therefrom for rotation of the drum. As shown, the drum is rotatably supported in a yoke on the upper end of a bracket 28 fixed to the tongue. A cable 30 is wound about the drum and the free end of the cable has a hook 32 which is engageable with an eye 34 on the boat. Thus, to load a boat on the trailer, the cable hook is engaged in the eye 34 on the boat and the cable is taken up by a counter-clockwise rotation of the drum. To unload the boat, the drum is permitted to rotate slowly in a clockwise direction to pay out the cable.

Bracket 28 also pivotally supports a pawl 36 which is engageable with a ratchet wheel 38 fixed to the drum. The pawl permits rotation of the drum in a counter-clockwise direction as viewed in FIG. 1, but prevents reverse rotation. The pawl can be manually lifted from engagement with the ratchet wheel to permit a clockwise rotation of the drum.

Considerable difficulty is often encountered in moving an unhitched trailer from place to place. Normally, the tongue will rest on the ground under these conditions and a great deal of effort is required to elevate the tongue, especially when the trailer is loaded. Elevation of the tongue is also necessary whenever it is desired to hitch or unhitch the trailer.

As a means for elevating the tongue for either of the purposes described above, I have devised a novel jack device which utilizes the standard winch and cable described.

My novel jack device is indicated generally at 39 and comprises a pair of brackets 40 and 42 which are secured together on opposite sides of the trailer tongue by bolts 44. The bracket 42 is in the form of a channel and is disposed so that the flanges 46 and 47 thereof are horizontal, one above the other. A pair of vertically aligned openings 48 and 49 are formed in the flanges, and an elongated vertical tubular rod or pipe 50 extends through the aligned openings 48 and 49. The rod is freely received in the aligned openings so that it may slide vertically or rotate.

A caster wheel 52 is removably mounted on the lower end of rod 50. As shown, a mounting bracket 54 is provided having a pin 56 projecting upwardly from the web thereof into the hollow interior of the rod or tube 50. A bushing 58 within the lower end of the rod or tube removably receives the pin 56 to provide a swivel mount so that the bracket 54 turns about the vertical axis of the pin. While preferably the pin 56 is thus swiveled in the lower end of the rod 50, a non-rotatable connection might be employed because the rod itself is free to rotate. In any event, the pin 56 can be removed from the bushing. Thus, the caster can be removed or separated from the rod and the rod withdrawn from the top when the jack is not in use. A horizontal axle 60 extends between the depending legs of the bracket and rotatably supports the caster wheel 52.

An eye-bolt 64 is secured to the upper flange of the bracket 42 and is linked through the eye of a pulley 66. The pulley has a sheave 67 about which the cable 34 may be reeved.

In order to utilize the jack to elevate the trailer tongue, the hook 32 on the end of the cable is engaged within the upper end of the rod and the intermediate portion of the cable is passed under the pulley sheave, as shown. The winch drum 24 is then rotated counter-clockwise to take up the cable, and rod 50 is urged downwardly with sufficient force to elevate the tongue. The caster wheel 52 will enable the trailer to be moved about with ease.

The pawl and ratchet 36 and 38 prevent reverse rotation of the winch and thus retain the tongue in elevated position. The pawl may be manually disengaged to pay out the cable and lower the tongue.

The hook 32 on the end of the cable may either be removable from the cable so that the cable can be threaded under roller sheave 67, or enough clearance may be provided in the pulley to permit the cable to be threaded without removal of the hook.

The sections of the cable from pulley sheave 67 to drum 24 and to the top of pipe 50 should be nearly parallel for ease in raising and lowering.

The caster wheel rotates relative to the supporting rod and the rod itself is rotatably mounted so that the trailer can be turned and moved about with ease. Since the caster and rod are separable, the caster may be removed from the rod and the rod withdrawn from the top when not in use for storage in some convenient place, such as the trunk of the towing vehicle.

It will thus be seen that I have devised a simple yet efficient boat trailer jack which may be operated by the standard winch and cable usually provided on trailers of this type.

What I claim as my invention is:

1. A jack for a boat trailer of the type having a wheeled boat support, a tongue projecting forwardly from said boat support for hitching to a towing vehicle, and a boat winch mounted on said tongue in fixed position thereabove having a cable for loading and unloading a boat; said jack comprising a mounting secured on said tongue having a vertical passage, an elongated upright member including an elongated vertical rod rotatable and vertically slidable in said passage, the upper end of said rod projecting above said mounting and the lower end thereof projecting below said mounting, said member also including a ground engaging wheel, a wheel mounting carried by the lower end of said rod for turning movement about the rod axis and supporting said ground engaging wheel for rotation about a horizontal axis, and means for forcing said member downwardly to cause said wheel to engage the ground under a pressure sufficient to elevate said tongue and for releasably locking said member against upward movement, said means including said boat winch and cable, a hook on the free end of said cable, said rod having an open tubular upper end to loosely receive the return-bent end of said hook, and a pulley attached to said first-mentioned mounting beneath said winch and the upper end of said rod under which an intermediate portion of said cable can be reeved to apply a downward force on said member when said hook is engaged with the open tubular upper end of said rod and said winch is operated to take up said cable, said wheel mounting and wheel being removable from said rod and said rod thereafter being removable in an upward direction from said first-mentioned mounting so that said rod, wheel mounting and wheel can be stored when not in use.

2. A jack for a boat trailer of the type having a wheeled boat support, a tongue projecting forwardly from said boat support for hitching to a towing vehicle, and a boat winch mounted on said tongue in fixed position having a cable for loading and unloading a boat; said jack comprising a mounting secured to said tongue adjacent said winch and having a vertical passage, an elongated vertically extending member slidable vertically in said passage, the upper end of said member projecting above said mounting and the lower end projecting below said mounting for engagement with the ground, and means for forcing said member downwardly into ground engagement under a pressure sufficient to elevate said tongue and for releasably locking said member against upward movement, said means including said boat winch and cable, said member having a part above said mounting adapted to be engaged by said cable, and an element carried by said mounting beneath said part of said member, said cable extending from said winch, being reeved under said element and extending from said element upward for engagement with said part of said member so that a downward force can be applied to said member when said winch is operated to take up said cable.

3. The jack defined in claim 2, wherein the portion of said member which slides vertically in said passage is an elongated vertical rod, and the ground-engaging portion of said member is a wheel assembly joined to the lower end of said rod beneath said mounting, said wheel assembly having an upwardly extending part, the lower end of said rod having a part for connection with said part of said wheel assembly, one of said parts having a recess opening toward and receiving the other of said parts to provide the aforesaid joint between said rod and wheel assembly, said wheel assembly being separable from said rod by a direct downward force on said wheel assembly to withdraw said other part from said recess and said rod thereafter being removable in an upward direction from said mounting so that said rod and wheel assembly can be stored when not in use.

4. The jack defined in claim 3, wherein said wheel assembly is rotatable with respect to said mounting about the axis of said rod.

5. The jack defined in claim 2, wherein a hook is provided on the free end of said cable, and said member has an open tubular upper end to loosely receive the return-bent end of said hook.

6. In a jack for a boat trailer or the like having a wheeled frame and a tongue projecting forwardly from said frame for hitching to a towing vehicle; a mounting adapted to be secured on said tongue having a vertical passage, an elongated vertical rod slidable vertically in said passage, a wheel assembly joined to the lower end of said rod beneath said mounting for engagement with the ground, said wheel assembly having an upwardly extending part, the lower end of said rod having a part for connection with said part of said wheel assembly, one of said parts having a recess opening toward and receiving the other of said parts to provide the aforesaid joint between said rod and wheel assembly, said wheel assembly being separable from said rod by a direct downward force on said wheel assembly to withdraw said other part from said recess and said rod thereafter being removable in an upward direction from said mounting so that said rod and wheel assembly can be stored when not in use, and a pulley attached to said mounting adjacent said passage and about which a cable for operating said rod can be reeved, said rod having a portion above said mounting and above said pulley adapted to be engaged by the cable.

References Cited in the file of this patent

UNITED STATES PATENTS

| | | |
|---|---|---|
| 1,716,311 | Harris | June 4, 1929 |
| 1,867,760 | Richards | July 19, 1932 |
| 2,238,411 | Conklin | Apr. 15, 1941 |
| 2,539,897 | Davey et al. | Jan. 30, 1951 |
| 2,638,315 | Wagner | May 12, 1953 |
| 2,774,609 | Winger | Dec. 18, 1956 |
| 2,788,908 | Lynd | Apr. 16, 1957 |
| 2,954,963 | Berg | Oct. 4, 1960 |
| 2,970,810 | Zich et al. | Feb. 7, 1961 |